(No Model.)
F. Von HEFNER-ALTENECK.
Dynamo-Electric Machine.
No. 234,353.
2 Sheets—Sheet 1.
Patented Nov. 9, 1880.
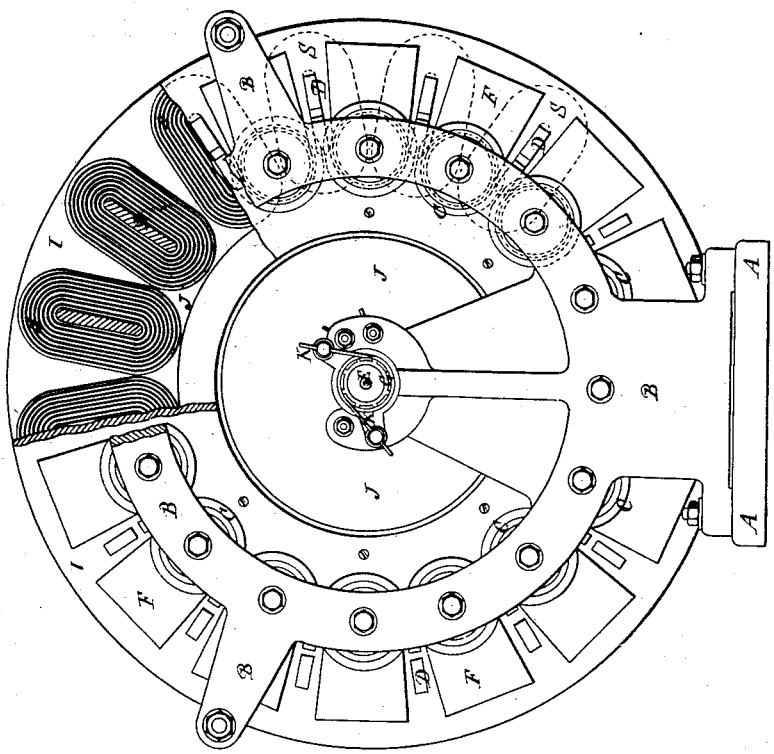
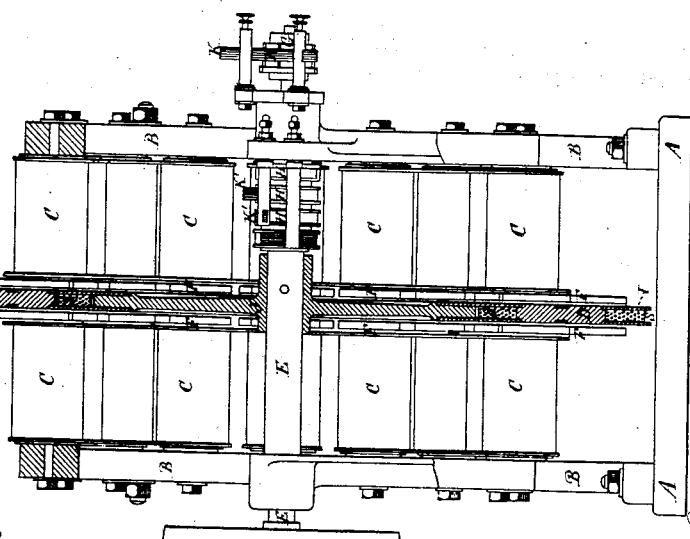

F. Von HEFNER-ALTENECK.
Dynamo-Electric Machine.
No. 234,353. Patented Nov. 9, 1880.
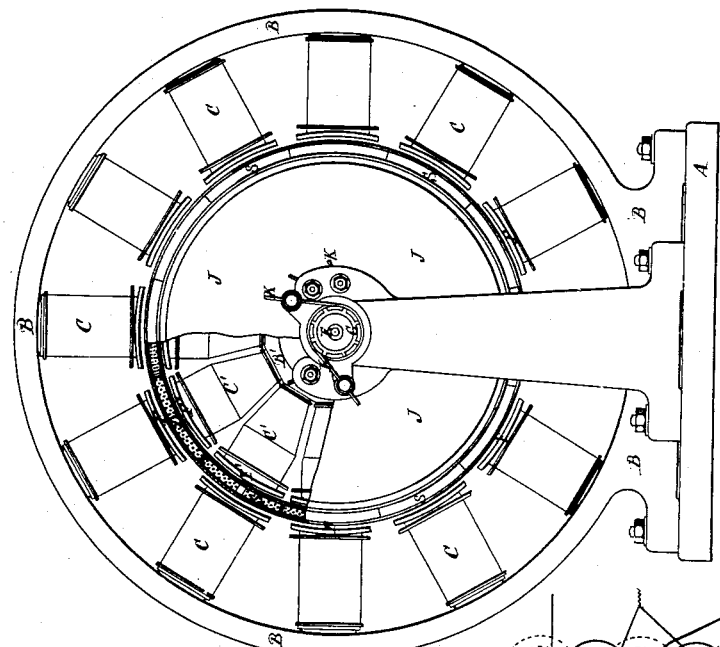
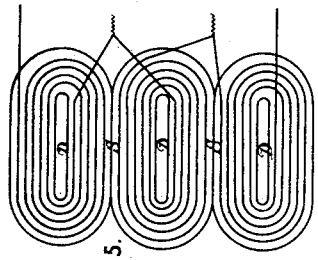
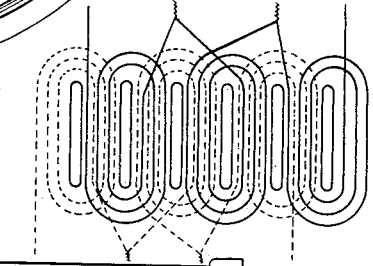
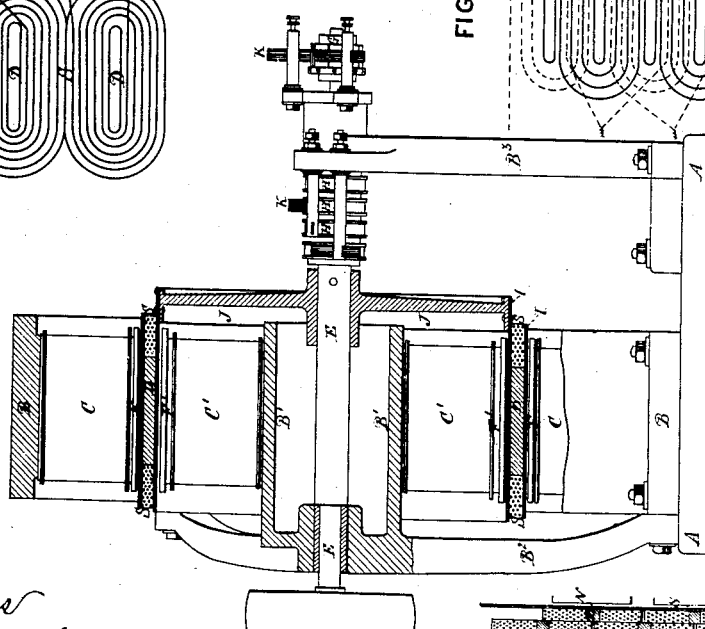

United States Patent Office.

FRIEDRICH VON HEFNER-ALTENECK, OF BERLIN, GERMANY.

DYNAMO-ELECTRIC MACHINE.

SPECIFICATION forming part of Letters Patent No. 234,353, dated November 9, 1880.

Application filed August 4, 1880. (No model.) Patented in England August 8, 1878.

*To all whom it may concern:*

Be it known that I, FRIEDRICH VON HEFNER-ALTENECK, of Berlin, in the German Empire, have invented an Improvement in Dynamo-Electric Machines, (for which a patent has been obtained in Great Britain and Ireland by Carl Heinrich Siemens, as a communication from abroad, bearing date August 8, 1878, No. 3,134,) of which the following is a specification.

My invention relates to those machines known as "dynamo-electric machines," in which mechanical motion is converted into electricity by causing coils of insulated wire to pass through successive polar fields of electro-magnets, whereby electrical currents are induced in the coils, these currents, or portions of them, being applied to excite the electro-magnets of the machine, and also to work electric lamps or perform other electrical functions in circuits external to the machine, or the currents produced by the machine being entirely applied for external use, while the electro-magnets of the machine are excited by electricity from an extraneous source.

I will describe the construction of a dynamo-electric machine according to my invention, referring to the accompanying drawings.

Figure 1 is a vertical section, and Fig. 2 is a side elevation, partly in section.

On a base, A, are fixed two side frames, B B, in which are formed bearings for a revolving shaft, E. On this shaft is fixed a disk, J, of non-magnetic material, such as wood, on each side of which is fixed a thin annular plate, I, also of non-magnetic material, such as brass.

Between the two plates I are secured a number of elongated cores, D, of wood or other non-magnetic material, each of these cores having wound on it a number of convolutions of insulated wire, forming coils S, of approximately elliptical shape, spaced uniformly round the circumference of the disk J.

As shown in the drawings, the cores D are held in position by being made with tenons entering mortises in the annular plates I I; but they might, obviously, be fixed in other ways—as, for example, by screws, pins, or rivets passing through the plates and cores.

On each of the frames B B are fixed electro-magnets C, consisting of iron cores secured by nuts to the frames, and having wound round them a number of convolutions of insulated wire. On each frame there are as many electro-magnets C as there are coils S on the disk, sixteen being shown on the drawings; but there might be any even number of them greater or less than sixteen.

To the inner end of the core of each electro-magnet is fixed an iron plate, F, the face of which is very close to but does not touch the annular plate I. Each plate F is of trapezoidal shape, forming an extension of the polar field of each magnet, so that when the disk, with its coils S, revolves between these poles, each of the coils S is nearly half-way over one of the plates F, in face of which it is about to pass, while it is still about half-way over the other plate F, from the face of which it is passing.

Assuming that the electro-magnets C are excited by the passage of electrical currents constant in direction through their coils, each plate F presenting polarity opposite to that of the plates on each side of it and of the plate facing it, then if the disk J, with its coils S, be caused to revolve, those coils, in passing through the alternate polar fields of the plates F, will have alternating currents induced in them, as is well understood. In order to collect and utilize these currents the wires of some of the coils S are connected to the insulated plates of a commutator, G, which is fixed on and revolves with the shaft E, and has two tangential wire brushes, K, bearing against it. These brushes being connected to the coils of the electro-magnets C, currents constant in direction are transmitted through the coils.

When a current of constant direction is required in the external circuit all the coils S may be connected to the plates of the commutator G, and the currents collected by the brushes K may be made to pass through the external circuit, as well as through the coils of the electro-magnets C.

When alternating currents are required in the external circuit—as, for example, for working various kinds of electrical lamps—some of the coils S are connected to insulated rings H, fixed on the shaft E, and having tangential wire brushes K' bearing against them, these brushes being connected to the external circuit or circuits.

Instead of arranging the coils S in the plane of a disk revolving between the poles of electro-magnets C, placed parallel to the axis of rotation, the coils S may be arranged on a cylindrical surface revolving between electro-magnets arranged radially, the machine in that case being constructed as shown in vertical section at Fig. 3, and in side elevation, partly in section, at Fig. 4. In this construction there are fixed on the base A two frames, B² and B³, providing bearings for the revolving shaft E, and an outer cylindrical ring, B, to which are attached the outer electro-magnets, C, radiating inward. The frame B² carries the inner cylindrical ring, B', to which are attached the inner electro-magnets, C', radiating outward. To the cores of the electro-magnets C and C' are fixed bent iron plates F and F', constituting polar extensions, between which the coils S for induction revolve. These coils are wound on elongated non-magnetic cores D, as shown in plan at Fig. 5. The cores D are held between two cylindrical non-magnetic plates, I I, attached to the periphery of the disk J, which is fixed on the shaft E. The commutator G, with its brushes K, and the insulated rings H, with their brushes K', being arranged and connected to the coils, as already described, the action is the same as in the previous construction. In both cases the coils S may be separately connected to the commutator-plates or to the rings, or they may be connected together in sequence, as shown in Fig. 5, with their convolutions connected alternately in opposite directions, the connections to the commutator-plates or rings being made to the loops where the wire of one coil meets the wire of the next in order.

Instead of a single series of coils they may be separated into two series rotating through the same magnetic fields, the coils in that case being arranged in a double layer, as shown in part section at Fig. 7 and part face view at Fig. 6.

In Fig. 7, N and S indicate the polar extensions of the electro-magnets, those facing each other having in this case the same polarity, and those succeeding each other having alternating polarity.

The coils of the two layers on the disk or on the cylindrical shell, instead of being immediately opposite each other, are arranged, as it may be said, to break joint, as shown in Figs. 6 and 7, each coil of the one layer extending half-way over each of an adjoining pair of the other layer, so that the maxima of the currents induced in the two layers do not coincide, but succeed each other in time.

Having thus described the nature of my invention and the best means I know of carrying it out in practice, I hereby declare that I make no general claim in respect of dynamo-electric machines wherein electro-magnets—that is to say, magnetic cores wound with insulated wire—revolve through polar fields; but I claim—

1. A dynamo-electric machine wherein elongated coils of insulated wire wound on non-magnetic cores revolve between the extended poles of pairs of electro-magnets arranged circularly, each of these magnets having its coil so connected as to present polarity opposite to that presented by the next magnet in order, substantially as herein described.

2. The combination of the electro-magnets C, having polar extensions F, the elongated coils S, wound on non-magnetic cores D, the non-magnetic disk J, the axis E, and the commutator G and its brushes K, substantially as herein described.

3. The combination of the electro-magnets C, the coils S, the disk J, the axis E, the commutator G and its brushes K with the insulated rings H and their brushes K', substantially as and for the purposes herein set forth.

In testimony whereof I have signed my name to this specification, in the presence of two subscribing witnesses, this 30th day of June, 1880.

FRIEDRICH VON HEFNER-ALTENECK.

Witnesses:
BERTHOLD ROI,
FRANK C. ZIMMERMAN.